United States Patent Office 3,271,369
Patented Sept. 6, 1966

3,271,369
STABILIZATION OF POLYOXYMETHYLENES
Werner Kern, Mainz, Germany, Volker Jaacks, Menlo Park, Calif., and Heinrich Deibig, Mainz, Germany, assignors to Deutsche Gold- und Silber-Scheideanstalt vormals Roessler, Frankfurt am Main, Germany
No Drawing. Filed Sept. 9, 1964, Ser. No. 395,326
Claims priority, application Germany, Sept. 11, 1963, D 42,456
7 Claims. (Cl. 260—67)

The present invention relates to an improved process for modifying the end groups of polyoxymethylene diols with epoxides, that is, compounds containing at least one oxirane group, to effect stabilization of such polyoxymethylenes.

Processes for protecting polyoxymethylenes against thermal decomposition and therefore rendering their use as high quality thermoplastic resins possible have been known for a long time. Normally, in the polymerization of formaldehyde or trioxane, polyoxymethylene products are obtained which have terminal, semiacetal hydroxyl groups which are formed from cleavage products of the initiator or from traces of chain transfer agents which may be present. Such terminal hydroxyl groups, as is well known, are thermally unstable and cause a rapid and complete decomposition of the polyoxymethylenes to formaldehyde already upon heating the polyoxymethylenes to temperatures below their melting point around 178° C. In order to stabilize the polyoxymethylenes, the terminal hydroxyl groups must be subjected to a suitable chemical reaction. The longest known and at the same time the most common technical method is the esterification of such hydroxyl groups with acid anhydrides. Such esterification with the aid of acetic acid anhydride produces polyoxymethylene diacetates which are stable up to over 220° C. (see H. Staudinger and W. Kern, Die hochmolekularen organischen Verbindungen, Springer, Berlin, 1932, page 224, and British Patent 770,717).

Polyoxymethylene with terminal ester groups, despite their increased thermal stability, nevertheless have certain disadvantages. First of all their low stability in the presence of alkalies is deleterious for many desired applications. Low molecular weight polyoxymethylene diacetate is already quickly dissolved in cold dilute NaOH. At higher temperatures the high molecular weight polyoxymethylene diacetates are also completely decomposed in dilute NaOH (compare Example 1).

As a consequence, attempts soon were made to introduce ether groups which do not exhibit these disadvantages into the polyoxymethylenes. While reactions with methanol and mineral acids, as catalysts, lead to polyoxymethylene dimethyl ethers of excellent stability against heat and alkalies (see H. Staudinger and W. Kern, ibid., page 224 and U.S. Patent 2,512,950), nevertheless, the mineral acids used effect strong decomposition of the polyoxymethylenes so that not only the yields of converted polyoxymethylenes as well as their molecular weights are too low for proper technical application. Similar results are obtained by the etherification of polyoxymethylene diols with dimethyl formal and mineral acids (compare Belgian Patent 570,884). Furthermore, the reaction with α-chloromethyl ethers with the addition of amines for neutralization of the HCl produced has also been suggested for such etherification (see German published application 1,091,750). While the losses of polyoxymethylene in the latter process are not too large, the etherification of the end hydroxyl groups effected is incomplete, which is evidenced by the lower stability of the products against heat and alkali.

It is also known to react polyoxymethylene dihydrates with epoxides in the presence of pyridine at higher temperatures. The resulting stabilized ether group containing polyoxymethylenes, however, have a relatively low thermal stability.

The object of the invention is to provide a process for the quantitative etherification of the terminal hydroxyl groups of polyoxymethylenes to produce polyoxymethylene diethers which are very stable against heat as well as against alkalies.

According to the invention it was found that such stabilized polyoxymethylenes can be obtained by modifying the end groups of the polyoxymethylene diols with epoxides if such modification is effected in the presence of one or more compounds with a mobile halogen atom, such as alkyl or aralkyl halides, e.g., triphenylmethyl chloride, and halides or halogen acids of aliphatic, aromatic or cyclic carboxylic acids.

Preferably compounds within the scope of the invention which have mobile halogen atoms are α-chloroalkyl and α-chloroaryl ethers of the formula:

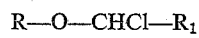

$$R{-}O{-}CHCl{-}R_1$$

wherein R represents an alkyl group containing 1 to 5 carbon atoms, a cycloalkyl group containing 5 to 7 carbon atoms, or an aryl group, such as a phenyl or naphthyl group; and $R_1$ represents hydrogen, an alkyl group containing 1 to 5 carbon atoms, an aryl group, such as a phenyl or naphthyl group, or an alkaryl group, such as a benzyl group; and esters of halo acids or acid halides. Examples of ether compounds suitable for the invention within the scope of the above formula are the α-chloro ethers like chloromethyl methyl ether, chloromethyl ethyl ether, chloromethyl propyl ether, chloromethyl butyl ether, chloromethyl pentyl ether, chloromethyl cyclohexyl ether, chloromethyl cycloheptyl ether, chloromethyl phenyl ether, chloromethyl benzyl ether, chloroethyl methyl ether, chloroethyl ethyl ether, chloropropyl methyl ether, chloropropyl ethyl ether, chlorobutyl methyl ether, chlorobutyl ethyl ether, chlorophenyl methyl ether, chlorophenyl ethyl ether, chlorobenzyl methyl ether, chlorobenzyl ethyl ether. Examples of acid halides within the scope of the invention are acetyl chloride, benzoyl chloride and chloroformic acid ethyl ester. And, examples of suitable esters of haloacids are: methyl ester of monochloroacetic acid, ethyl ester of monochloroacetic acid, ethyl ester of α-chloropropionic acid, ethyl ester of chloroformic acid.

An especially preferred compound having a mobile halogen atom according to the invention is triphenylmethyl chloride.

Polyoxymethylene diols produced by all known methods regardless of whether they were produced by solution or suspension polymerization or bulk polymerization are adapted for stabilization according to the invention.

The etherification of such polyoxymethylene diols can be effected with practically all exopides. Ethylene and propylene oxides, butylene-1,2-oxide, epichlorohydrin, butadiene-1,2-monoxide, styrene oxide, cyclohexene oxide and various glycidyl ethers, including aliphatic saturated and unsaturated, cycloaliphatic and aryl glycidyl ethers, such as phenyl glycidyl ether, methyl, ethyl, n- and i-propyl, n-, i-, and tertiary butyl glycidyl ethers, allyl glycidyl ether and cyclohexyl glycidyl ether, have proved particularly suitable. Compounds containing more than one epoxide group, such as, for example, butane diol diglycidyl ether, can also be used. The etherification can be carried out with only one epoxide compound or with mixtures of epoxide compounds.

The reaction of the polyoxymethylene diols with the epoxides preferably takes place in a mixture of the epoxide and the compound having the mobile halogen atom. However, it also is possible to carry out the reaction in an inert medium. The reaction can be carried out at temperatures between 50 and 240° C., but the favorable reaction temperatures normally are between 120 and 200° C. The reaction period required for quantitative etherification depends upon the reaction temperature employed and upon the type of reactants and may vary from a few minutes to several hours.

The stoichiometric quantities of the epoxides required for the etherification of high molecular weight polyoxymethylene diols are rather small. Normally a slight excess of epoxide is employed.

The halogen containing compounds are employed in quantities of 1 to 50 mol percent with reference to the epoxide.

The mobile halogen containing compounds are removed after completion of the etherification. Suitable methods, for example, are washing or boiling them out with organic solvents or with aqueous alkalies, reprecipitation from dimethyl-formamide or the addition of a relatively non-volatile epoxide. Thereafter, a known antioxidants may be added to improve the resistance of the modified polyoxymethylene to molecular oxygen at elevated temperatures. In addition, known stabilizers, such as urea, hydrazine or their derivatives, or fillers, such as carbon black, silica gel or metal oxides, as well as coloring materials, may be incorporated in the modified polyoxymethylenes produced according to the invention.

The modified polyoxymethylenes obtained according to the invention are thermally stable at temperatures up to over 240° C. and are inert to alkalies. Their average molecular weight, as has already been indicated, can be varied considerably.

If unconverted polymer chains are still present in very small quantities in the modified polyoxymethylenes produced according to the invention, they may be decomposed by boiling with dilute alkalies or by heating and thus be removed.

The etherified polyoxymethylenes produced according to the invention with or without added materials are suited for processing with shaping, particularly for injection molding.

The following examples will serve to illustrate the invention. In such examples the proportions are given by weight unless specified otherwise.

Example 1

500 parts of polyoxymethylene diol ($\eta_{sp}/c.=0.13$ l./g. measured at 140° C. in dimethyl-formamide corresponding to a mol. wt. of about 200,000) were heated to 150° C. together with 1000 parts of triphenylmethyl chloride and 10,000 parts by vol. of phenyl glycidyl ether for 2 hours. After the reaction product had been boiled out with ethanol and washed out with acetone, 455 parts of a modified polyoxymethylene remained which were 85% stable against alkalies. The etherified product had a $\eta_{sp}/c.$ value of 0.068, corresponding to a molecular weight of about 81,000. The etherified product was heated to 190° C. under nitrogen until it lost less than 0.2% of its weight per hour. During such heating a total of 10% of the polymer decomposed whereas the remaining 90% were thermally stable. In contrast, the unmodified starting polyoxymethylene when heated under the same conditions was 97% decomposed after 3 hours' heating. On the other hand, when a corresponding mixture of polyoxymethylene diol and phenyl glycidyl ether omitting the triphenylmethyl chloride was heated for 2 hours at 150° C., the resulting product was only 11% stable against alkalies. The portion stable against alkalies was determined by 20 hours' boiling of 150 mg. of the modified polyoxymethylene with a solution of 4 g. of NaOH in 25 cc. of water and 25 cc. of alcohol while stirring rapidly with a magnetic stirrer. After such boiling the product was washed thoroughly several times with water.

Example 2

500 parts of polyoxymethylene diol, as in Example 1, 1000 parts of triphenylmethyl chloride and 3000 vol. parts of propylene oxide were heated together for 2 hours at 150° C. in an autoclave provided with a glass insert. After processing as in Example 1, 475 parts of modified polyoxymethylene were obtained which were 86% stable against alkalies. The $\eta_{sp}/c.$ value of the product was 0.072 l./g., corresponding to a molecular weight of about 90,000.

Examples 3–6

Mixtures of 500 parts of polyoxymethylene diol as in Example 1. 3000 vol. parts of propylene oxide and 2000 vol. parts of the halogen containing compounds indicated in the following Table 1 were heated for 2 hours under pressure at 150° C. After processing as in Example 1, the yield of alkali stable portions determined as in Example 1, thermally stable portions (determined at 190° C. under pure nitrogen) and the $\eta_{sp}/c.$ values given in the following Table 1 were obtained:

TABLE 1

| Ex. No. | Halogen containing compound | Quantity modified polyoxy-methylene recovered | Alkali stable portion | Thermally stable portion | | No. 31 $\eta_{sp}/c.$ (l./g.) |
|---|---|---|---|---|---|---|
| | | | | (a) | (b) | |
| 3 | Acetyl chloride | 360 | 83 | 97 | 95 | 0.019 |
| 4 | Benzyl chloride | 465 | 87 | 98 | 96 | 0.021 |
| 5 | Chlorodimethyl ether | 430 | 93 | 95 | 94 | 0.017 |
| 6 | Chloroformic acid ethyl ester | 480 | 52 | 66 | ---- | 0.047 |

(a) Determined after reprecipitation from dimethyl-formamide containing 10% of 1,4-butane diol diglycidyl ether.
(b) Determined after adding 2% of 1,4-butane diol diglycidyl ether.

We claim:
1. In a process for stabilizing a polyoxymethylene diol by etherification of its terminal hydroxy groups with an epoxide compound having a terminal oxirane group, the step comprising reacting the polyoxymethylene diol with a combination of said epoxide compound and a compound selected from the group consisting of
   an alkyl halide
   an aralkyl halide
   an acid halide of an aliphatic carboxylic acid
   an acid halide of an aromatic carboxylic acid
   an acid halide of a cyclic carboxylic acid
   an α-chloro ether represented by the structure

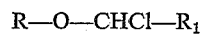

R—O—CHCl—R₁ wherein R is selected from the group consisting of
   an alkyl group containing 1 to 5 carbon atoms, a cycloalkyl group containing 5 to 7 carbon atoms and an aryl group containing up to 10 carbon atoms; and R₁ is selected from the group consisting of hydrogen, an alkyl group containing 1 to 5 carbon atoms, an aryl group containing up to 10 carbon atoms and an aralkyl group containing up to 7 carbon atoms
   and esters of halo acids.

2. A process as in claim 1 wherein the reaction is carried out in the presence of a compound selected from the group consisting of acetyl chloride, benzoyl chloride and chloroformic acid ethyl ester and α-chloromethyl methyl ether.

3. A process as in claim 1 wherein the compound containing a mobile halogen atom is present in an amount of 1 to 50 mol percent based on the amount of epoxide compound present.

4. In a process for stabilizing a polyoxymethylene diol by etherification of its terminal hydroxy groups with an epoxide compound having a terminal oxirane ring, the step comprising carrying out said etherification with a combination of said epoxide compound and triphenylmethyl chloride.

5. In a process for stabilizing a polyoxymethylene diol by etherification of its terminal hydroxy groups, the step comprising reacting said polyoxymethylene diol with a combination of triphenylmethyl chloride and phenyl glycidyl ether.

6. In a process for stabilizing a polyoxymethylene diol by etherification of its terminal hydroxy groups, the step comprising reacting said polyoxymethylene diol with a combination of triphenylmethyl chloride and propylene oxide.

7. In a process for stabilizing a polyoxymethylene diol by etherification of its terminal hydroxy groups, the step comprising reacting said polyoxymethylene diol with a combination of propylene oxide and a compound selected from the group consisting of acetyl chloride, benzyl chloride, chlorodimethyl ether and the ethyl ester of chloroformic acid.

References Cited by the Examiner

UNITED STATES PATENTS 3,183,211  11/1965  Brinker et al. _____ 260—67

FOREIGN PATENTS 702,123  1/1965  Canada.

OTHER REFERENCES

Kern et al., Angewandt Chemie, 73, No. 6, March 21, 1961, pp. 177–244. Pages 184–185 relied on.

WILLIAM H. SHORT, *Primary Examiner.*

L. M. MILLER, *Assistant Examiner.*